United States Patent [19]

Yanik et al.

[11] 4,071,439
[45] Jan. 31, 1978

[54] HYDRODESULFURIZATION SHUTDOWN METHOD

[75] Inventors: Stephen Joseph Yanik, Valencia; James Albert Frayer, Pittsburgh, both of Pa.

[73] Assignee: Gulf Research & Development Company, Pittsburgh, Pa.

[21] Appl. No.: 729,185

[22] Filed: Oct. 4, 1976

[51] Int. Cl.$^2$ .............................................. C10G 23/02
[52] U.S. Cl. .................................................. 208/216
[58] Field of Search ...................... 208/216, 213, 209

[56] References Cited

U.S. PATENT DOCUMENTS

| | | | |
|---|---|---|---|
| 2,866,750 | 12/1958 | Mosesman | 208/216 |
| 3,423,307 | 1/1969 | McKinney et al. | 208/216 |
| 3,840,473 | 10/1974 | Beuther et al. | 208/216 |

*Primary Examiner*—George Crasanakis

[57] ABSTRACT

A shutdown procedure for residual hydrocarbon hydrodesulfurization process which employs a catalyst comprising Group VI-B and Group VIII metals, in sulfided form, supported on a refractory oxide and promoted with a minor amount of titanium.

6 Claims, No Drawings

HYDRODESULFURIZATION SHUTDOWN METHOD

BACKGROUND OF THE INVENTION

A hydrodesulfurization process for residual hydrocarbons and employing a catalyst composition promoted with titanium is described in U.S. Pat. No. 3,840,473. As described therein, titanium is added to a Group VI-B and Group VIII metals-containing catalyst composition and the prepared catalyst composition, in sulfided form, is employed in the hydrodesulfurization of residual-containing liquid hydrocarbons.

Conventional shutdown procedures for residual hydrocarbon hydrodesulfurization processes involve passing a high velocity hydrogen-containing gas over the fixed catalyst bed during the cooling step. Utilizing this shutdown procedure, it was observed that the catalyst suffered a loss of activity and stability at startup following the shutdown. To correct this deficiency, it was necessary to presulfide the catalyst in a manner similar to that employed when the catalyst was fresh. This method of operation is unsatisfactory, particularly in those instances when the hydrodesulfurization unit must be shutdown because of an emergency.

SUMMARY OF THE INVENTION

An improved shutdown procedure for residual hydrocarbon hydrodesulfurization processes employing a titanium-promoted catalyst composition comprises the steps of lowering the temperature in the hydrodesulfurization zone containing the catalyst while maintaining a flow of residual hydrocarbon and hydrogen to the zone, substituting a distillate feed for the residual hydrocarbon feed, eliminating the flow of hydrogen, and thereafter continuing to cool the catalyst in the absence of hydrogen by passing a distillate hydrocarbon to the hydrodesulfurization zone.

DESCRIPTION OF THE INVENTION

The shutdown procedure of this invention is applicable to hydrodesulfurization processes wherein the feed to the hydrodesulfurization process can comprise an atmospheric topped crude or a vacuum residual fraction boiling substantially above about 950° F. (510° C.). Such feed stocks contain a substantial quantity of residual components, asphaltic contaminants and metalliferous components. The residual feed stocks employed in the described hydrodesulfurization process can also be derived from shale oil, tar sands and coal. Generally, the feed stocks to the hydrodesulfurization process of this invention contain at least 10 percent by volume of a residual fraction boiling above about 950° F. (510° C.).

The carrier or support employed in the hydrodesulfurization catalyst of this invention can be any non-zeolitic refractory oxide having a surface area in excess of 3 square meters per gram, such as pure alumina, a silica-stabilized alumina containing up to about 5 percent by weight based upon the carrier of silica, silica gels, acid leached boro-silicate glass, and spinels, e.g. magnesium aluminate. Preferably, however, the carrier or support is silica-free and contains no more than a minor proportion (less than a total of 3.0 weight percent) of one or more of refractory metal oxides, other than alumina, such as thoria, boria, titania, magnesia, zirconia, etc. The refractory oxide carrier should be substantially zeolitic-free.

The hydrogenating components employed in our catalyst composition comprise a combination of Group VI-B and Group VIII metals in the sulfided form. Preferably, the hydrogenating components are employed in an atomic ratio of Group VIII metal to Group VI-B metal of at least 1:0.3 and more preferably at a ratio of at least 1:1.0. Generally, catalysts with a Group VIII to Group VI-B atomic ratio in excess of about 1:5 are not used and more preferably an atomic ratio of less than 1:2.5 is utilized. Further, the catalysts of our invention have a total Group VI-B plus Group VIII metals content of at least about 5% by weight based upon the total catalyst and preferably at least about 8% by weight. Generally, catalysts containing more than about 30% by weight hydrogenation metals are not employed. Suitably, the catalysts of this invention can be comprised of combinations of the iron group metals and Group VI-B metals such as molybdenum and tungsten. Of the iron group metals cobalt and nickel are preferred, particularly nickel, and of the Group VI-B metals molybdenum is preferred. Illustrative of particularly preferred combinations of hydrogenation metals are combinations of nickel-molybdenum and cobalt-molybdenum.

The catalysts of this invention are promoted with titanium. The titanium can be present in the catalyst composition as a metal, its oxide or sulfide. Accordingly, we employ catalysts containing at least 1% by weight titanium based upon the total catalyst weight and preferably containing at least about 2.5% by weight. While there does not appear to be any upper limit of titanium which can be employed, there does not appear to be any advantage to employing above about 10% by weight of titanium based upon the total weight.

The catalyst compositions can be prepared by a method described in the aforementioned U.S. Pat. No. 3,840,473, the catalyst preparation method of the reference being incorporated herein by reference thereto. The catalyst employed in the hydrodesulfurization process of this invention should contain substantially no phosphates. While the presence of phosphates in the catalyst can be tolerated on the contaminant level, i.e., less than about 0.5% by weight and preferably less than about 0.1% by weight, it is desired that no phosphates be present at all. It has been observed that phosphate levels as low as about 1% by weight have an adverse effect upon the catalytic activity and a phosphate content approaching 2% by weight is completely unacceptable.

The Group VI-B and Group VIII hydrogenation components of the prepared catalyst composite are employed in the sulfided form. The catalyst can be presulfided after calcination, or after calcination and reduction by methods known in the art. For example, the presulfiding can be conducted by employing a hydrogen sulfide and hydrogen gaseous mixture at a temperature in the range of 500 to 700° F. (261° to 372° C.) and at an elevated pressure. The exact proportions of hydrogen and hydrogen sulfide are not critical. Additionally, presulfiding of the catalyst can be accomplished by employing a mercaptan or carbon disulfide utilizing methods known in the art. Although not to be limited thereto, preferably the presulfiding is conducted until the concentration of sulfur on the catalyst is in the range from 2.5 to 17.0 weight percent.

In the hydrodesulfurization process, the feed stock is brought into contact with the above-defined catalyst composition maintained in a hydrodesulfurization zone operated at a temperature in the range from about 500° to about 1,000° F. (260° to 538° C.), preferably in the range from about 600° to about 800° F. (316 to 427° C.). The space velocity maintained in the hydrodesulfurization zone can be in the range from about 0.10 to about 10.0 volumes of feed stock per volume of catalyst per hour and preferably in the range from about 0.3 to about 5.0. Contact between the catalyst composition and the feed stock is conducted in the presence of a hydrogen feed rate of from about 500 to about 10,000 standard cubic feet per barrel of feed stock (14,160 to 283,200 liters per 159 liters of feed stock), and preferably at a hydrogen flow rate in the range from 1,000 to about 8,000 SCF/B (28,320 to 226,560 liters per 159 liters of feed stock).

The pressure employed in the hydrodesulfurization process can be in the range from about 100 to about 5,000 psig (7.02 to 352 kgs/cm$^2$). When treating a distillate feed stock, i.e., a feed stock containing substantially no residual components, preferably a pressure in the range from about 200 to about 3,000 psig (14.1 to 211 kgs/cm$^2$) is employed. When treating a residual-containing stock, such as, for example, a reduced crude (atmospheric tower bottoms) or a residual stock boiling substantially above about 950° F. (510° C.), pressures in the range from about 250 to about 2,500 psig (17.6 to 176 kgs/cm$^2$) are preferred.

Initiating the shutdown procedure of this invention begins with the lowering of the hydrodesulfurization temperature while continuing the flow of residual hydrocarbon and hydrogen to the hydrodesulfurization zone containing the catalyst. Upon reduction of the hydrodesulfurization zone temperature to a desired level, a distillate feed [containing less than 1.0 volume percent asphaltenes and boiling substantially above 400° F. (204° C.)] is substituted for the residual hydrocarbon feed to the hydrodesulfurization zone. Although not to be limited thereto, the hydrodesulfurization zone pressure is preferably reduced to a 1,000 psig (70 kgs/cm$^2$) or less prior to substitution of the distillate feed.

Preferably, the hydrodesulfurization zone temperature has been reduced to 500° F. (260° C.) or less prior to substitution of the distillate hydrocarbon feed for the residual feed. Cooling of the hydrodesulfurization zone is continued with the flow of distillate oil and hydrogen to the hydrodesulfurization zone.

When the temperature of the hydrodesulfurization zone has been reduced to 250° F. (121° C.) or less, preferably to a temperature of 150° F. (65.6° C.), the flow of hydrogen to the hydrodesulfurization zone is discontinued. The distillate oil feed to the hydrodesulfurization zone containing the catalyst is continued until a desired handling temperature is obtained, normally ambient temperature. Although not to be limited thereto, the hydrodesulfurization zone can thereafter be flushed by discontinuing the distillate feed and passing a naphtha feed to the hydrodesulfurization zone.

The following examples are presented to illustrate objects and advantages of this invention. However, it is not intended that the invention be limited to the specific embodiments presented therein.

EXAMPLE I

In this Example the effect of employing a conventional shutdown procedure in the hydrodesulfurization of a residual hydrocarbon feed stock employing a catalyst comprising nickel, titanium and molybdenum on alumina is demonstrated. The catalyst composition employed in the hydrodesulfurization run of this Example and the run of Example II comprises 3.0 weight percent nickel, 5.0 weight percent titanium and 8.0 weight percent molybdenum on alumina. The residual hydrocarbon feed contained 1.0 weight percent sulfur and was further characterized as follows:

| | |
|---|---|
| Gravity, ° API | 22.8 |
| Nitrogen, wt. % | 0.17 |
| ASTM Distillation: ° F. | |
| 10% | 595 (313° C) |
| 20% | 676 (358° C) |
| 30% | 743 (395° C) |
| 40% | 806 (430° C) |
| 50% | 867 (464° C) |
| 60% | 937 (503° C) |

The residual hydrocarbon feed was charged to a hydrodesulfurization zone containing the defined catalyst. A gaseous stream comprising 92.0 volume percent hydrogen was passed to the hydrodesulfurization zone at the circulating rate of 4,200 standard cubic feet per barrel (118,944 L/159 L) and a hydrogen partial pressure of 1,980 psia (138.60 kg/cm$^2$) was maintained in the hydrodesulfurization zone. A hydrocarbon product containing 0.31 weight percent sulfur was continuously withdrawn from the hydrodesulfurization zone.

The hydrodesulfurization run was conducted for a period of 146 days, at which time the temperature maintained in the hydrodesulfurization zone to produce the desired product was 752° F. (400° C.). At this time, the hydrodesulfurization run was shutdown by the procedure of stopping the oil feed and maintaining temperature and hydrogen flow. The linear velocity of the hydrogen stream was maintained at about 7 feet per second. After two hours, the pressure was reduced to 1,500 psig (105.5 kg/cm$^2$), and the temperature reduced at a rate of 25° – 50° F. (14° – 28° C.) per hour until the catalyst was cooled to 500° F. (260° C.). At this point, the pressure was reduced to 300 psig (21.1 kg/cm$^2$) and the cooling continued until the catalyst reached ambient temperature of 90° F. (32° C.).

Upon startup after the shutdown, the temperature required to maintain a 0.31 weight percent sulfur product increased rapidly from 752° F. (400° C.) on startup or the 148th day after startup of the run to 764° F. (406.7° C.) on the 160th day after start of the hydrodesulfurization run. At this time the run was shutdown, again employing the shutdown procedure described above. Upon subsequently starting up the run again on the same day of the shutdown, the temperature required to maintain a 0.31 weight percent sulfur product increased rapidly from 764° F. (406.7° C.) to 774° F. (412.2° C.) on the 180th day after start of run. This run demonstrates an unreasonable loss of activity and stability of the catalyst composition following the use of conventional shutdown procedures. The average catalyst aging rate for the period from 70 days up to 146 days was 0.11 °F/day (0.06 °C/day) and from 148 to 180 days the average catalyst aging rate was 0.84 °F/day (0.47 °C/day).

EXAMPLE II

In this Example the effect of employing the inventive shutdown procedure in the hydrodesulfurization of the residual hydrocarbon feed stock of Example I employing the catalyst composition of Example I is demonstrated.

After 95 days of operation of employing process parameters, other than temperature, similar to Example I to produce a sulfur product containing 0.31 weight percent sulfur, a hydrodesulfurization zone temperature of 779° F. (415° C.) was required. On the 96th day of the run, the unit was shutdown by lowering the temperature to 500° F. (260° C.) while maintaining a flow of hydrogen and residual hydrocarbon feed to the hydrodesulfurization zone. A distillate oil (having a boiling range of 375° F. (191° C.) to 640° F. (338° C.)) was interchanged for the residual feed to the hydrodesulfurization zone when the temperature reached 500° F. (260° C.) and the hydrogen flow to the hydrodesulfurization zone was terminated when the temperature of the hydrodesulfurization zone reached 150° F. (66° C.). Cooling of the hydrodesulfurization zone was continued by passing the distillate oil until ambient temperature of 90° F. (32° C.) was obtained in the hydrodesulfurization zone. Thereafter the hydrodesulfurization catalyst was flushed with naphtha.

Upon startup on the same day of the shutdown, a hydrodesulfurization zone temperature of 780° F. (415.6° C.) was required to obtain a 0.31 weight percent sulfur product. On the 106th day after start of the run a hydrodesulfurization zone temperature of 781° F. (417° C.) was required to obtain a residual hydrocarbon product containing 0.31 weight percent sulfur. A comparison of the results obtained in this Example with the results obtained in Example I demonstrates that the catalyst activity was substantially unaffected when employing the shutdown procedure of this Example whereas substantial reduction in catalyst activity was the result of employing the conventional shutdown procedure of Example I.

EXAMPLE III

In this Example the run of Example II was continued with the exception that the hydrogen circulation rate was reduced to 2,500 standard cubic feet per barrel (70,800 L/159 L) and the hydrogen partial pressure was reduced to 1,850 pounds per square inch (129 kg/cm$^2$). The temperature required to obtain a 0.31 weight percent sulfur product was 785° F. (418° C.).

After equilibrium was established at the new conditions, the run was continued for a period of 5 days. On the 5th day of operation the temperature required to maintain a product containing 0.31 weight percent sulfur was 789° F. (420.6° C.). This represented a decrease in catalyst activity as measured by an average daily increase in reaction temperature of 0.80° F. (0.44° C.) per day.

On the 11th day of the run of this Example the hydrodesulfurization operation was shut down employing the shutdown procedure of Example II. Following shutdown, the unit was started up again on the same day and was continuously operated under the run conditions specified above, with the exception of temperature, for an additional 7 days. Upon startup the temperature required to maintain a 0.31 weight percent sulfur product was 789° F. (420.6° C.) and at the end of the run the temperature required to maintain a 0.31 weight percent sulfur product was 794° F. (423° C.). The decrease in the activity of the catalyst as measured by the average daily rise in temperature during this portion of the run was equal to 0.71 °F/day (0.31 °C/day).

A comparison of the run of this Example with the run of Example I demonstrates that the shutdown procedure of this invention prevents undue loss of catalyst activity and stability upon shutdown. Essentially no loss of activity and stability was observed employing the shutdown procedures of Examples II and III.

Obviously, the shutdown procedure of this invention can be employed for temporary or emergency shutdowns and is equally applicable for scheduled shutdowns when it is desired to regenerate or replace the catalyst. By employing the shutdown procedure, catalyst activity and maintenance is substantially improved.

Although the invention has been described with reference to specific embodiments, references, and details, various modifications and changes will be apparent to one skilled in the art and are contemplated to be embraced in this invention.

We claim:

1. In a process for the hydrodesulfurization of a sulfur-containing residual hydrocarbon feedstock wherein said hydrocarbon feedstock is contacted under hydrodesulfurization conditions in a hydrodesulfurization zone with hydrogen and a catalyst, wherein said catalyst consists essentially of a hydrogenating metal selected from Group VI-B and at least one hydrogenating metal selected from Group VIII, said hydrogenating metals being in the sulfided form and being supported on a refractory oxide carrier selected from the group consisting of alumina, a silica-stabilized alumina containing up to about 5 percent by weight based upon the carrier of silica, silica gels, acid leached boro-silicate glass, and spinels and wherein said catalyst is being promoted with from about 1.0 to about 10.0 weight percent of a Group IV-B metal; a shutdown procedure for said process which comprises lowering the reaction temperature in said hydrodesulfurization zone while maintaining the flow of residual hydrocarbon feedstock and hydrogen to said hydrodesulfurization zone, substituting a distillate feed for the residual hydrocarbon feedstock to said hydrodesulfurization zone after said temperature has been lowered, eliminating the flow of hydrogen to said hydrodesulfurization zone after said substituting step, and continuing to cool said catalyst in the absence of hydrogen by passing said distillate hydrocarbon through said hydrodesulfurization zone.

2. The process of claim 1 wherein the pressure in said hydrodesulfurization zone is reduced to 1,000 psig or less prior to substituting said distillate feed for said residual hydrocarbon feed.

3. The process of claim 2 wherein said distillate hydrocarbon feed is substituted for said residual hydrocarbon feed after the temperature has been reduced to 500° F. (260° C.) or less.

4. The process of claim 3 wherein the flow of hydrogen to said hydrodesulfurization zone is eliminated when the temperature has been reduced to 150° F.

5. The process of claim 4 wherein the flow of distillate hydrocarbon to said hydrodesulfurization zone is continued until ambient temperature is reached in said hydrodesulfurization zone.

6. The process of claim 5 which includes the step of contacting said catalyst with a naphtha flush after said catalyst has reached ambient temperature.

* * * * *